US008494531B2

(12) United States Patent
Soliman et al.

(10) Patent No.: US 8,494,531 B2
(45) Date of Patent: *Jul. 23, 2013

(54) SYSTEM AND METHOD FOR CREATING A WIRELESS PICOCELL

(75) Inventors: Samir S. Soliman, San Diego, CA (US); Franklin Peter Antonio, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/090,249

(22) Filed: Mar. 25, 2005

(65) Prior Publication Data

US 2006/0217121 A1 Sep. 28, 2006

(51) Int. Cl.
*H04W 36/00* (2009.01)
*H04W 40/00* (2009.01)
*H04W 4/00* (2009.01)

(52) U.S. Cl.
USPC ........... 455/444; 455/443; 455/446; 455/448; 370/328

(58) Field of Classification Search
USPC .......................... 455/431, 446, 444, 448, 443
See application file for complete search history.

(56) References Cited

U.S. PATENT DOCUMENTS

| 5,448,619 | A |   | 9/1995  | Evans et al. |
|-----------|---|---|---------|--------------|
| 5,535,259 | A | * | 7/1996  | Dent et al. .................. 455/452.1 |
| 5,848,359 | A | * | 12/1998 | Furtaw .......................... 455/447 |
| 5,940,743 | A |   | 8/1999  | Sunay |
| 6,144,653 | A |   | 11/2000 | Persson et al. |
| 6,269,243 | B1 |  | 7/2001  | Corbefin et al. |
| 6,405,048 | B1 | * | 6/2002  | Haartsen ........................ 455/464 |
| 6,718,172 | B1 | * | 4/2004  | Cook et al. .................. 455/452.2 |
| 6,829,479 | B1 | * | 12/2004 | Chang et al. .................. 455/431 |
| 6,987,978 | B2 | * | 1/2006  | Masuda et al. ............. 455/456.4 |
| 8,165,592 | B2 |  | 4/2012  | Soliman et al. |
| 2003/0035388 | A1 | | 2/2003 | Schmidt |

FOREIGN PATENT DOCUMENTS

| JP | 05199177   | 8/1993 |
| JP | 09065420   | 3/1997 |
| JP | 2000031877 | 1/2000 |

(Continued)

OTHER PUBLICATIONS

International Search Report and Written Opinion—PCT/US2006/010957, International Search Authority—European Patent Office—Dec. 1, 2006.

(Continued)

*Primary Examiner* — Huy C Ho
(74) *Attorney, Agent, or Firm* — Florin C. Corie

(57) ABSTRACT

A system and method are provided for creating a picocell service alternate to a wireless network service. The method comprises: detecting a multiple access (MA) wireless communications network, such as a terrestrial or satellite network; and, generating a first picocell in a response to detecting the MA wireless network. Typically, the method comprises receiving requests for picocell service from mobile stations, in response to generating the first picocell. In one aspect, the service requests made by the mobile stations are denied. In another aspect, the method further comprises: establishing a first picocell MSC; and, providing network services to mobile stations via the first picocell, in response to the requests for picocell service. For example, the first picocell MSC may provide the same network services that are provided by a conventional terrestrial network, for example. Alternately, the method establishes an alternative wireless network (a second picocell) to provide services.

36 Claims, 5 Drawing Sheets

FOREIGN PATENT DOCUMENTS

| | | |
|---|---|---|
| JP | 2000505261 T | 4/2000 |
| JP | 2001086566 | 3/2001 |
| JP | 2003507977 | 2/2003 |
| JP | 2006527943 A | 12/2006 |
| WO | WO9731503 A1 | 8/1997 |
| WO | WO0076242 | 12/2000 |
| WO | 0115466 A | 3/2001 |
| WO | WO0115466 A1 | 3/2001 |
| WO | 2004112418 A | 12/2004 |

OTHER PUBLICATIONS

Translation of Office Action in Japanese application 2008-503259 corresponding to U.S. Appl. No. 11/090,249, citing WO9700296 dated Feb. 8, 2011.

* cited by examiner

SYSTEM AND METHOD FOR CREATING A WIRELESS PICOCELL

BACKGROUND OF THE INVENTION

1. Field of the Invention

This invention generally relates to wireless communications and, more particularly, to a system and method for creating a picocell as an alternative to a multiple access wireless network service.

2. Description of the Related Art

Air travel has become an integral part of our lives. Today, airplanes seem to be the last remaining island where mobile communications and Internet access are not always available. Market surveys of in-flight network providers show the desirability of high-data rate communication services for airliners, with an obvious trend towards in-flight entertainment (IFE), Internet applications, and personal communications.

Further, people are becoming more accustomed to their own personalized equipment, such as mobile phones, laptops, or PDAs, all accommodated with their own personal environment. Future airliners will provide a variety of entertainment and communications equipment to the passenger to make the journey more pleasant through in-flight entertainment, more productive through business communication facilities, and more secure through tele-medicine and surveillance facilities on board.

In addition, a plane full of "captive" travelers may be quite alluring to advertisers, especially since the Web pages that passengers see can be tailored to their destination, be it a trade show, tourist site, or even just a city that wishes to publicize its amenities.

Thus, thinking of future mobile communication from a user acceptance point of view, there is a clear demand for a wireless access solution for multimedia and personal communication services through the user's own equipment.

The use of conventional cellular and PCS phones are prohibited in commercial aircraft, while the aircraft is in the air. Allowing an aircraft-borne phone to communicate with terrestrial cells is not desirable, as the phones must transmit at a relatively high power with a communicating terrestrial cell, and may interfere with other, adjoining cells on the ground.

As noted in U.S. Pat. No. 6,144,653, Persson et al., a typical cellular telephone system divides a geographical area into several smaller, contiguous radio coverage areas called "cells." The cells are served by a series of fixed radio stations called base stations. The base stations are connected to, and controlled by a mobile services switching center (MSC). The MSC, in turn, is connected to the landline public switched telephone network (PSTN). The telephone users (mobile subscribers) in the cellular radio system are provided with portable (hand-held), transportable (hand-carried) or mobile (car-mounted) telephone units (mobile stations) that communicate voice and/or data with the MSC through a nearby base station. The MSC switches calls between and among landline and mobile subscribers, controls signaling to the mobile stations, compiles billing statistics, and provides for the operation, maintenance, and testing of the system.

The base stations are located at the center of the cells and are equipped with omni-directional antennas transmitting equally in all directions. In some circumstances, a base station may be located near the periphery of a cell, or it may illuminate the cells with directional radio signals directionally. Each of the base stations is connected by voice and data links to a mobile services switching center (MSC) which is, in turn, is connected to a central office in the public switching telephone network (PSTN), or a similar facility, e.g., an integrated system digital network (ISDN). A plurality of mobile stations may be found within the cells. Mobile subscribers may travel from one location in a cell to another or from one cell to an adjacent or neighboring cell.

Each of the cells is allocated a set of the channels assigned to the entire cellular system by a concerned government authority, e.g., the Federal Communications Commission (FCC) in the United States. The channels are used to support voice, data, and paging/access or control channels between each of the base stations and the mobile stations in its coverage area. The link between base station and mobile unit is bidirectional. Therefore, separate channels are assigned to a mobile station and base station for transmission. When in the idle state (turned on but not in use), each of the mobile stations tunes to and then continuously monitors the strongest control channel (generally, the control channel of the cell in which the mobile station is located at that moment) and may receive or initiate a telephone call through one of the base stations. When moving between cells while in the idle state, the mobile station will tune to the control channel of the strongest cell. The initial tuning to, and the change of control channel is accomplished automatically by scanning all the control channels in operation in the cellular system to find the strongest control channel. When a control channel with good reception quality is found, the mobile station remains tuned to this channel until the quality deteriorates again.

While in the idle (standby) state, each of the mobile stations continuously determines whether a page message addressed to it has been received over the control channel. The called mobile station with the matching identification automatically transmits a page response over the control channel to the base station, which forwards the page response to the MSC. Upon receiving the page response, the MSC selects an available voice channel in the cell from which the page response was received, turns the selected voice channel transceiver on, and requests the base station in that cell to order the mobile station via the control channel to tune to the selected voice channel. A through-connection is established once the mobile station has tuned to the selected voice channel.

Similar control procedures exist for code division multiple access (CDMA), time division multiple access (TDMA) frequency division multiple access (FDMA) systems such as Global System for Mobile communications (GSM), or UMTS networks, to name a few examples.

The concept of a variable cell sizes has been applied to multiple access telephone networks, classifying cells into a megacell, macrocell, microcell, minicell, or picocell according to the size. A picocell is typically employed to provide an in-building communication service, and provide a communication service to a limited area such as campus, stadium, airport and shopping mall. Further, the picocell is used to compensate for deterioration of the service quality of the macrocell, due to topographical obstacles such as a tunnel, to increase the communication quality in an area with a low communication quality.

The advent of spread spectrum systems such as CDMA2000, Universal Mobile Telecommunications System (UMTS), and low power picocell access, offers potential avenues to further the use of conventional wireless telephones in aircraft. Further, potential solutions may stem from new aircraft avionics technologies inline with aircraft development.

It would be advantageous if a picocell could be formed in special circumstances, such as in an aircraft cabin, without interfering with conventional terrestrial multiple access telephone network communications.

It would be advantageous if the above-mentioned picocell could provide mobile stations, in controlled spaces or zones, with the same services as provided by the conventional multiple access telephone networks.

SUMMARY OF THE INVENTION

Air travel has become an integral part of our lives and there is an increased demand that air travel be made more productive and pleasant for the passengers. Market studies for airlines and aircraft industries show the desirability of being able to provide high-data rate communications services, with an emphasis on Internet applications. An aeronautical multimedia system would permit passengers to log on through a wireless network on the plane through their own laptop computers, personal digital assistants, or cell phones from inside an aircraft or airports. Telemedicine, tele-learning, tele-tourism, and tele-work are only few examples of the services suitable for an aeronautical multimedia services.

The present invention describes a cellular microcell, picocell, or multiple picocells that provides services to conventional commercial wireless devices. The problem being solved involves the currently imposed restrictions that prevent communications, inside an airplane, between cellular/PCS phones and terrestrial networks while the plane is in the air. Allowing the phone to communicate with terrestrial cells is not desirable, as the phones must transmit at relatively high power to a terrestrial cell.

The present invention describes a system and method that permits air travelers to use their phones, laptops, and PDAs inside airplanes. The system comprises a sniffer and a spoofer. The sniffer detects and classifies the terrestrial wireless signal(s) that can be used to serve users inside the cabin. The information is sent to a control unit that configures the spoofer to generate a spoofed control signal, stronger than terrestrial network control signals received and detected by the sniffer. In one aspect, the spoofed signal directs the phones inside the cabin to use an alternate dedicated technology, frequency band, frequency channel, or code channel.

Accordingly, a method is provided for creating a picocell service alternate to a wireless network service. The method comprises: detecting a multiple access (MA) wireless communications network, such as a terrestrial or satellite network; and, generating a first picocell in response to detecting the MA wireless network. Typically, the method comprises receiving requests for picocell service from mobile stations, in response to generating the first picocell. In another aspect, the method further comprises: establishing a first picocell MSC; and, providing network services to mobile stations via the first picocell, in response to the requests for picocell service. For example, the first picocell MSC may provide the same network services that are provided by a conventional terrestrial network. Alternately, the method establishes an alternative wireless network (a second picocell). The second picocell, which may include an MSC and BS, generates second picocell control signals. The first picocell, in response to receiving requests for picocell service, uses its control signals to direct the mobile stations to the second picocell control signals.

In one aspect, MA wireless network base station control signals are received at a first power level in the picocell. Then, generating first picocell control signals includes generating picocell control signals having a second power level in the picocell, greater than the first power level. The higher power level of the first picocell control signals insures that the mobile stations cannot detect the terrestrial base station control signals. One of the advantages of generating the first picocell, is that the first picocell controls the transmit power levels of mobile stations in the picocell.

Additional details of the above-described method and a picocell system alternative to a conventional MA wireless network service are provided below.

DETAILED DESCRIPTION

Figure 1:
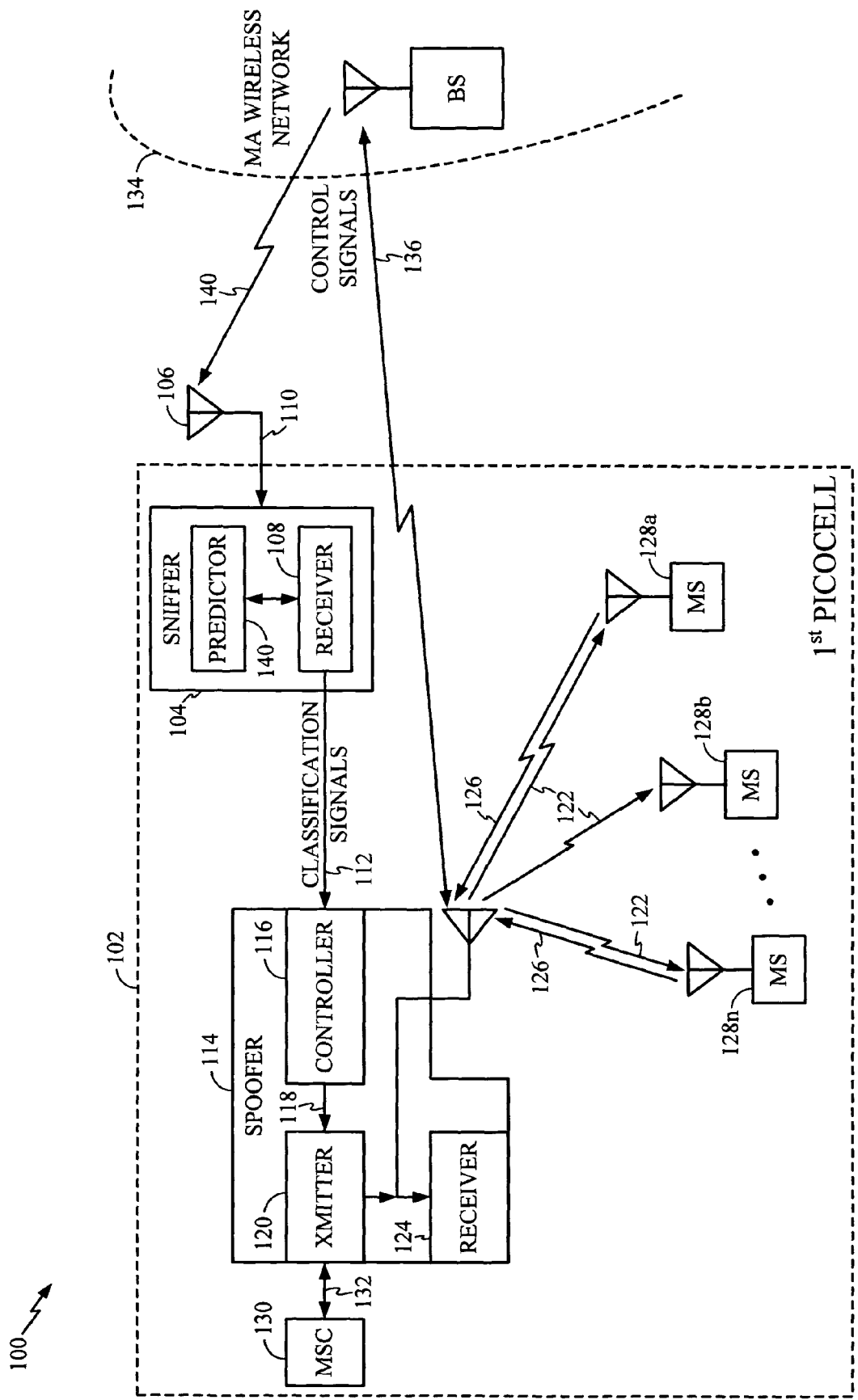
FIG. 1 is a schematic block diagram of a picocell system alternate to a multiple access wireless network service.

FIG. 1 is a schematic block diagram of a picocell system alternate to a multiple access wireless network service. The system 100 comprises a first picocell 102. The first picocell 102 includes a sniffer 104 having an antenna 106 and a receiver 108 to accept multiple access (MA) wireless network communications on line 110. The sniffer 104 can be programmed to periodically sweep predetermined frequency bands of interest, searching for frequency or code channels. For example, the MA wireless network can be a conventional terrestrial or satellite wireless telephone service. The sniffer 104 has an output on line 112 to supply detected network classification signals. The first picocell 102 also comprises a spoofer 114. The spoofer 114 includes a controller 116, having an input on line 112 to accept the classification signals and an output on line 118 to supply a spoofed signal responsive to the classification signals. As used herein, the word "picocell" is not intended to be associated with any particular geographic dimensions or cell size, except that it is smaller than a conventional MA wireless telephone cell sector.

The spoofer 114 also includes a transmitter 120 having an input on line 118 to accept the spoofed signal and an output, represented by reference designator 122, to transmit first picocell control signals in response to the spoofed signals. In one aspect, the spoofer 114 further includes a receiver 124 having an input, represented by reference designator 126, to accept requests for picocell service from mobile stations (MSs) 128. The requests are received in response to the transmitter 120 generating the first picocell control signals. Shown are MSs 128*a*, 128*b*, and 128*n*. However, the system 100 is not limited to any particular number of MSs. The term "mobile station" as used herein is intended to encompass various types of communications devices including wireless telephone device of any protocol, personal data assistants (PDA), laptops, external or internal modems, PC cards, and other similar devices.

For example, the sniffer receiver 108 may accept MA wireless network control signals 140 received at a first power level, while the spoofer transmitter 120 generates first picocell control signals 122 at a second received power level, greater than the first received power level (from the perspective of a mobile station 128 in the first picocell 102). The higher power level control signals generated by the first picocell prevent the MSs 128 for "seeing" and, therefore, responding to the terrestrial network control signals. The acquisition of cells, the establishment of communications between base stations and MSs, and other wireless telephone control signal details have been discussed in the Background Section of this application, above. The spoofer transmitter 120 transmits controls signals 122, and MSs 128 locate and respond to the first picocell control signals in the same manner as if the control signals were being generated by a conventional MA wireless network base station.

In one simple aspect of the system, the spoofer 114 acts as a conventional (but low-power) BS that prevents the MSs 128 from communicating with the conventional MA wireless network.

For example, the first picocell can be established in a movie theater or religious center. Then, the spoofer controller 116 can be used to deny all service requests made by mobile stations communicating (receiving control signals 122) in the first picocell. This denial of service prevents a call from being received by a user who forgets to turn off their MS. Alternately, the spoofer controller 116 prevents mobile stations 128, which are communicating in the first picocell 102 (receiving control signals 122), from making requests for network service. Thus, the system prevents a rude user from originating a call that would be disruptive to people or electrical equipment located nearby.

Alternately, the first picocell 102 may provide services. In this aspect, the system 100 further comprises a first picocell mobile services switching center (MSC) 130 having an interface on line 132 connected to the spoofer 114. The first picocell MSC 130 provides network services to mobile stations 128, using the spoofer 114 as a base station, or as an access point.

For example, the sniffer receiver 108 may detect a MA wireless network providing a service, and the spoofer transmitter 120 generates first picocell control signals 122 identifying a picocell service equivalent to the network service. The first picocell 102 may permit the MSs to enjoy the same services being provided by the terrestrial MA network. The services may be telephone voice communications, email services, or high-data rate services that enable Internet type services. Alternately stated, the first picocell completely mimics the terrestrial wireless network.

Assuming that the first picocell is in a commercial airplane, the first picocell may communicate with the MA network 134, or other MA networks (not shown) through a connection between the first picocell MSC 130 and an aircraft transceiver (not shown). The aircraft transceiver may be connected to a conventional terrestrial or satellite network, or a custom carrier network on a "safe" channel.

Alternately, the spoofer 114 may transceive communications, represented by reference designator 136, between a MA network 134 and a mobile station 128, via the transmitter 120 and receiver 124. In one aspect, the sniffer 104 identifies information associated with a MA network 134 such as base station location, antenna height, antenna coverage, antenna type, morphology, control channel gains, traffic channel gains, frequency usage, or time slot usage. Then, the spoofer 114 schedules high-burst communications between the MA network 134 and the spoofer 114 responsive to the identified MA network information. For example, the high-burst communication may be carried out in a time slot or frequency calculated to minimally interfere with the MA network. The high-burst communications may be carried out as a result of management information developed by a predictor 140. The predictor 140 may use information that is gathered by the sniffer 104, information from predictor memory, or information from both sources.

In another aspect, the predictor 140 may be enabled to predict MA network channel usage. The channel loading and other MA network information gathered by the sniffer can be used to manage the first picocell resources in such a manner as to minimally interfere with the MA network. The sniffer 104 supplies the management information to the spoofer 114 in the classification signal 112.

The predictor management information can be used to select the channels and communication medium used by the spoofer 114 to communicate with MSs 128 in the first picocell 102, for example. Alternately, some or all of the MA network information can be pre-loaded into a memory associated with the predictor. The predictor 140 can use the pre-loaded data to make decisions and generate the management information sent to the spoofer. The management information can be used to select channels that are unused in the MA network 134, for use in the first picocell 102. Alternately, if no unused channels are available, a channel can be "shared" by both the MA network 134 and the first picocell 102. The management information is used to select a shared channel that minimally interferes with the MA network 134.

FIG. 1 shows a single picocell 102. However, it should be understood that a zone may be established with a plurality of picocells. Each of these picocells acts as an equivalent for every terrestrial or satellite phone system that is likely to be encountered. These picocells may simply deny service, or provide MA wireless telephone network type services. Alternately, some of the picocells may provide services to MSs seeking one particular service (i.e., PCS), while other picocells deny particular services (i.e., AMPS).

The sniffer receiver 108 accepts control signals originating from a MA wireless network base station, as represented by reference designator 140. The receiver 108 supplies classification signals on line 112, responsive to identifying the wireless network. The spoofer transmitter 120 generates first picocell control signals 122 equivalent to the MA wireless network base station control signals 140. For example, the control signal may be in the same frequency band, modulated the same, and organized in the same medium access control (MAC) format.

In one aspect, the sniffer receiver 108 scans a frequency spectrum, identifies signals in a spectrum band, identifies the signal modulation, identifies a system associated with the modulation, and measures the detected signal power level. For example, the sniffer receiver 108 may identify a terrestrial cellular wireless telephone system, and identify a serving sector in the system.

One advantage resulting from the generation of the first picocell 102, is that the spoofer 114 generates first picocell control signals 122 that regulate the transmit power levels of mobile stations in the first picocell. That is, the first picocell 102 may create a closed-loop power control mechanism, where the spoofer 114 sends commands to the various MSs 128, directing the MSs to communicate at prescribed transmit power levels. Since the picocell is relatively small, the transmit power levels are low, and a minimum of interference is generated, from the point of view of adjacent networks and proximate electrical equipment. Some details of conventional closed-loop power control have been provided in the Background Section of this application.

Figure 2:
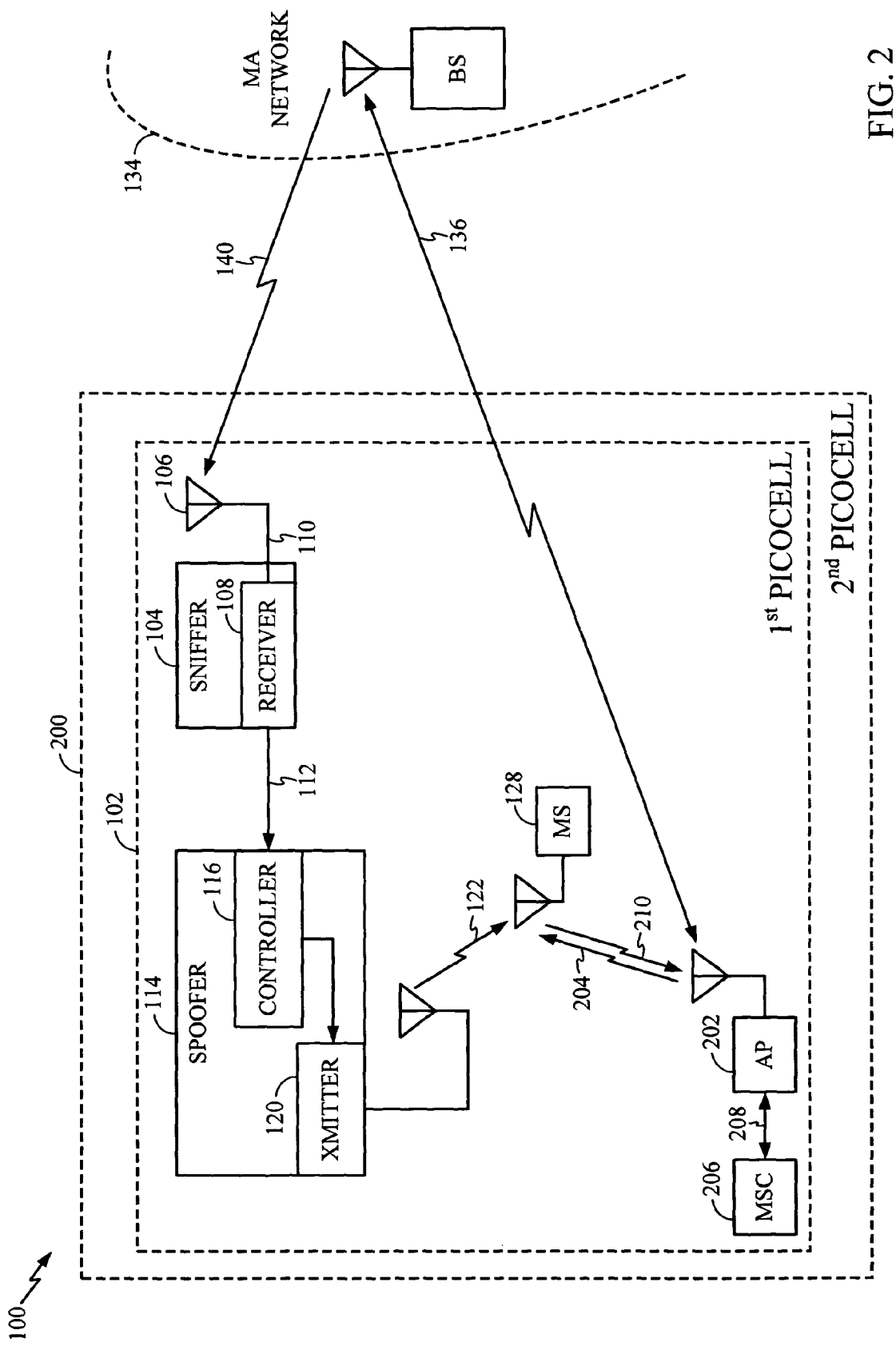
FIG. 2 is a schematic block diagram illustrating a two-picocell variation on the system of FIG. 1.

FIG. 2 is a schematic block diagram illustrating a two-picocell variation on the system of FIG. 1. The system 100 further comprises a second picocell 200. The second picocell 200 includes an access point (AP) 202, or base station, for supplying wireless network control signals, represented by reference designator 204. In this variation, the spoofer transmitter 120 generates control signals 122 directing the mobile stations 128 to the second picocell access point control signals 204. Typically, the second picocell 200 includes an MSC 206, which may also be called a server or controller, connected to the access point 202 on line 208, for supplying network services. For example, the services may be telephone voice communications, email services, or higher data rate services that enable Internet type services, as represented by reference designator 210.

In one example, the second picocell is a conventional wireless telephone network, except that the access point (base station) 202 transmits at relatively low power levels. Typically, the second picocell 200 is established so that the MSs 128 can operate in a safe medium (frequency, time slot, code), for example a band of frequencies that will not interfere with terrestrial cells.

Generally then, the sniffer receiver 108 accepts control signals 140 originating from a MA wireless network base station transmitting in a first communication medium. The communication media can be frequency span, channel (frequency, time slot, code), wireless telephone protocol (CDMA as opposed to GSM), or technology (Bluetooth as opposed to a wireless telephone protocol), to name a few examples. To illustrate one simple example, the first communication medium is assumed to be a first span of frequencies, in larger frequency band. In this aspect, the spoofer transmitter 120 generates first picocell control signals 122 in the first medium, directing mobile stations to control signals 204 being broadcast in an alternate communication medium. The second picocell access point 202 transmits second picocell control signals in the alternative communication medium. To finish the example, the second communication medium can be a second span of frequencies in the same frequency band, or in a different frequency band.

Thus, the second picocell access point 202 generates control signals 204 in an alternate communication medium, which is not the first communication medium, such as an alternate frequency, an alternate time slot, an alternate channel, an alternate spreading code, and alternate frequency band, or an alternate wireless telephone protocol, for example CDMA instead of GSM. In other aspects, the alternate communication medium can be an alternate technology, such as IEEE 802.11, as opposed to a wireless telephone protocol. The alternate communication medium selected may be deemed less detrimental to adjacent terrestrial networks or proximate electrical equipment.

In one aspect, the AP 202 may transceive communications, represented by reference designator 136, between a MA network 134 and a mobile station 128. In one aspect, the sniffer 104 or AP 202 identifies information associated with a MA network 134, so that the AP can schedule high-burst communications with the MA network 134. For example, the high-burst communication may be carried out to minimally interfere with the MA network 134.

Alternately not shown, the second picocell 200 is not used and the first picocell 102 provides the control signals that spoof the MA network 134, as well as the control signals and traffic channels required to support communications in the alternate communication medium. For example, the spoofer transmitter 120 and receiver 122 may be able to support communications in a plurality of communication media. The second picocell 200, used to supply the alternate communication medium, is shown for emphasis, to clarify that communications are occurring in two different media.

Figure 3:
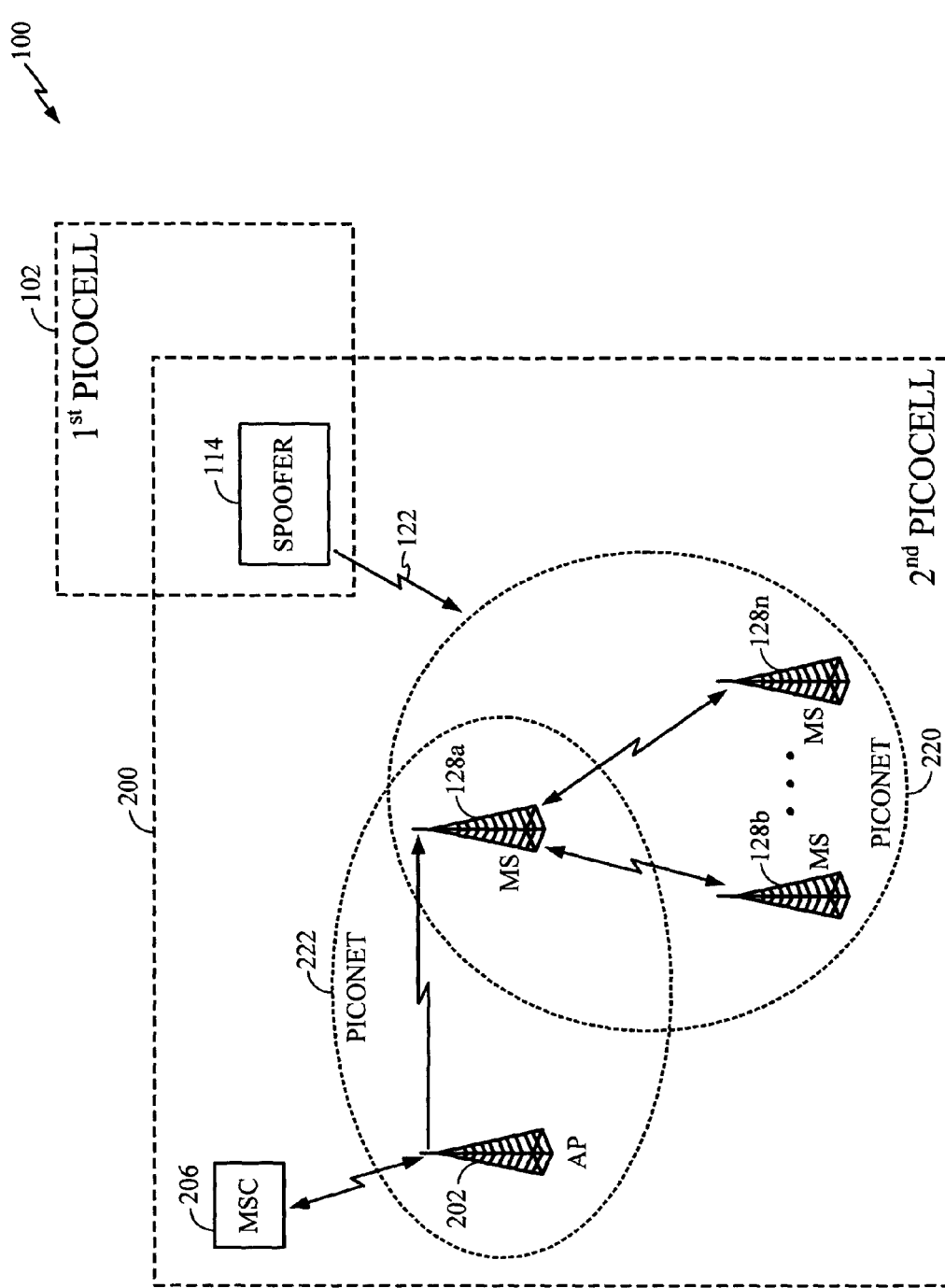
FIG. 3 is a schematic block diagram illustrating a first variation of the two-picocell system of FIG. 2.

FIG. 3 is a schematic block diagram illustrating a first variation of the two-picocell system of FIG. 2. As an alternative to the system of FIG. 2, a plurality of piconets is established within the second picocell 200. For example, some of the MSs 128 may act as masters, and other MSs as slaves. As shown, MS 128a acts as the master of piconet 220, where MSs 128b and 128n are slaves. MS 128a is a slave in piconet 222, where the AP 202 is the master. If the master MSs act as relays to the AP 202, this arrangement advantageous keeps the transmitted power levels low.

A piconet may be established as a result of a mobile station (terminal) 128 being unable to find a pilot signal of sufficient signal strength to support the minimum data rate. This may result from any number of reasons. By way of example, the MSs 128b and 128n may be too far from the AP 206. Alternatively, the propagation environment may be insufficient to support the requisite data rate. In either case, the MSs 128b and 128n may be unable to join the existing piconet 222, and therefore, MS 128a must operate as master, transmitting its own pilot signal. MSs 128b and 128n are able to receive the pilot signal broadcast from MS 128a with sufficient strength and join the piconet 220. The establishment of piconet 220 enables communications between MSs 128b and 128n, and the AP 206.

Figure 4:
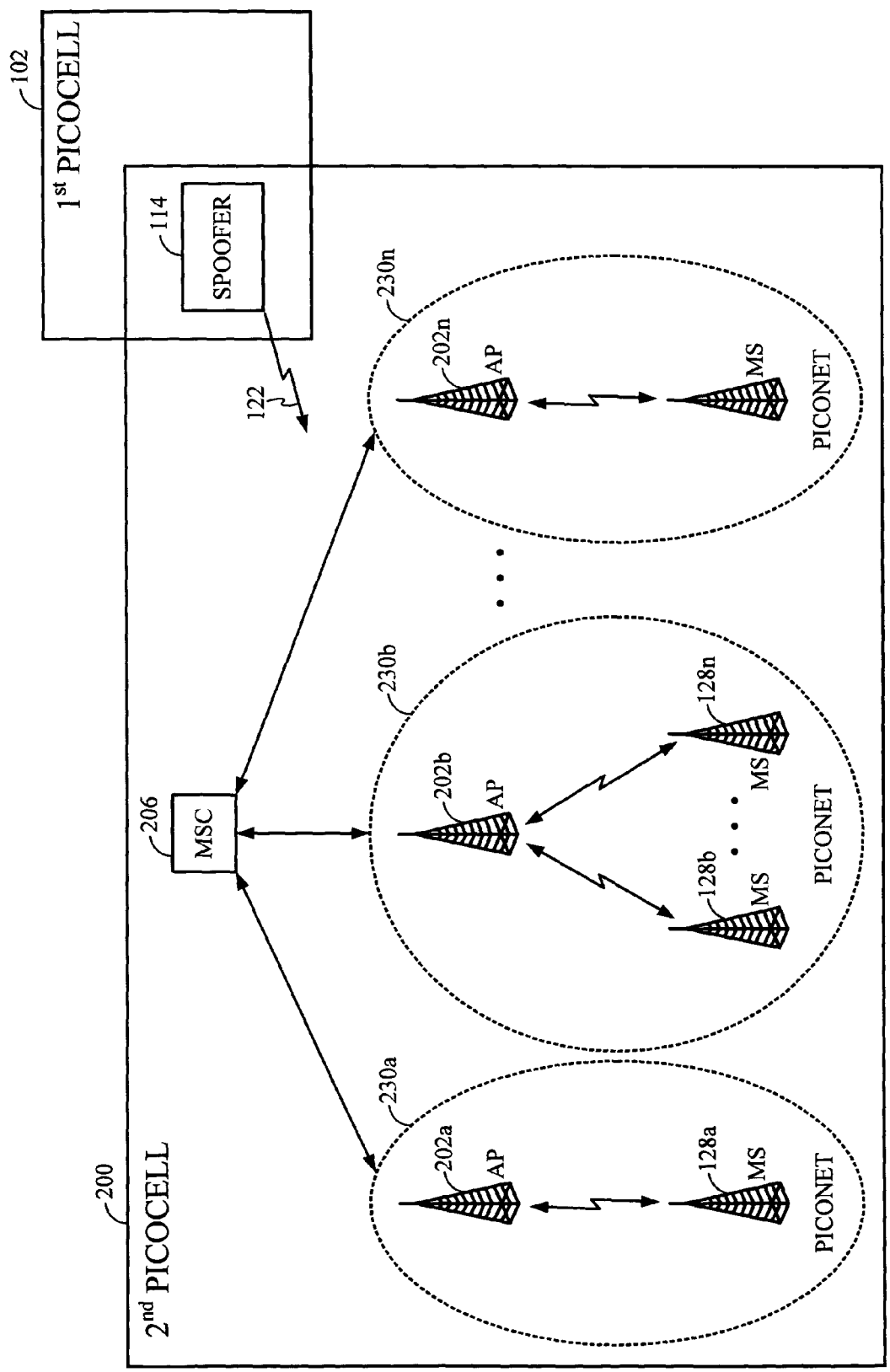
FIG. 4 is a schematic block diagram illustrating a second variation of the two-picocell system of FIG. 2.

FIG. 4 is a schematic block diagram illustrating a second variation of the two-picocell system of FIG. 2. Multiple radio units may be linked together in a wireline network, and deployed at fixed locations in the area served by the second picocell, serving as network access points. Shown are APs 202a, 202b, and 202n. But the invention is not limited to any particular number of APs. The access points 202a, 202b, and 202n are the masters, forming piconets 230a, 230b, and 230n, respectively. The mobile stations 128 are slaves of the access points to which they connect. Each access point defines an independent piconet. A central server 206, also referred to herein as an MSC, typically manages the access points 202, while taking care of upper-level protocol functions, such as authentication and Internet Protocol (IP) routing.

When the MSs are directed by the first picocell control signals 122, to search for second picocell control signals, the MSs 128 may search for pilot signals from piconet masters. The pilot signal broadcast by each piconet master may be an unmodulated spread-spectrum signal, or some other reference signal. In spread-spectrum configurations, a psuedo-random noise (PN) code unique to each piconet master may be used to spread the pilot signal. Using a correlation process, the MS may search through possible PN codes to identify the master with the strongest pilot signal. If the strongest pilot signal is received with sufficient signal strength to support a minimum data rate, then the MS may attempt to join the piconet by registering with the master. More generally, these piconet pilot signals may be referred to as second picocell control signals.

FIGS. 2 through 4 shows a single picocell 102 and a single picocell 200. However, it should be understood that a zone (i.e., an aircraft cabin) may be established with a plurality of "first" and "second" picocells. The plurality of "first" picocells may act as an equivalent for every terrestrial or satellite phone system that is likely to be encountered, generating control signals for each encountered system. A one-to-one correlation may exist between "first" and "second" picocells, so that a plurality of "second" picocells provides an equivalent service for every terrestrial/satellite network. Alternately, it is possible that several "first" picocells may direct MSs to a single "second" picocell. As another alternative, some "second" picocells may not exist for MSs limited to particular protocols and/or frequencies.

Functional Description

The present invention system permits air travelers to use their phones, laptops, and PDAs to communicate with an airplane high-speed multimedia communication system. The system consists of two major components: a sniffer and a spoofer.

The sniffer is a subsystem that performs the following functions:
- Spectrum scanning;
- Signal detection;
- Modulation classification;
- System identification;
- Serving sectors identification; and
- Signal level determination.

The output of this subsystem is a list of all wireless signals detected inside the cabin, a list of all wireless technologies used with these wireless services, list of frequency channels, list of all site IDs (codes and/or frequency assignments), and the power levels of all these received signals.

The spoofer is a subsystem that performs the following functions:
- For each technology detected, duplicating the control signals;
- Ensuring that the picocell control signals are stronger than the corresponding terrestrial signals;
- Substantially confining the control signals inside the cabin, so as to not interfere with the terrestrial wireless service; and
- Using the spoofed control signals to direct the wireless device inside the cabin to use an alternate technology, frequency band, or channel.

This system can be used to prevent the usage of cellular phones in special places like movie theaters, churches, and hospitals. Changes in the system parameters may result in control signals that force the in-cabin (in picocell) phones to be configured.

Figure 5:
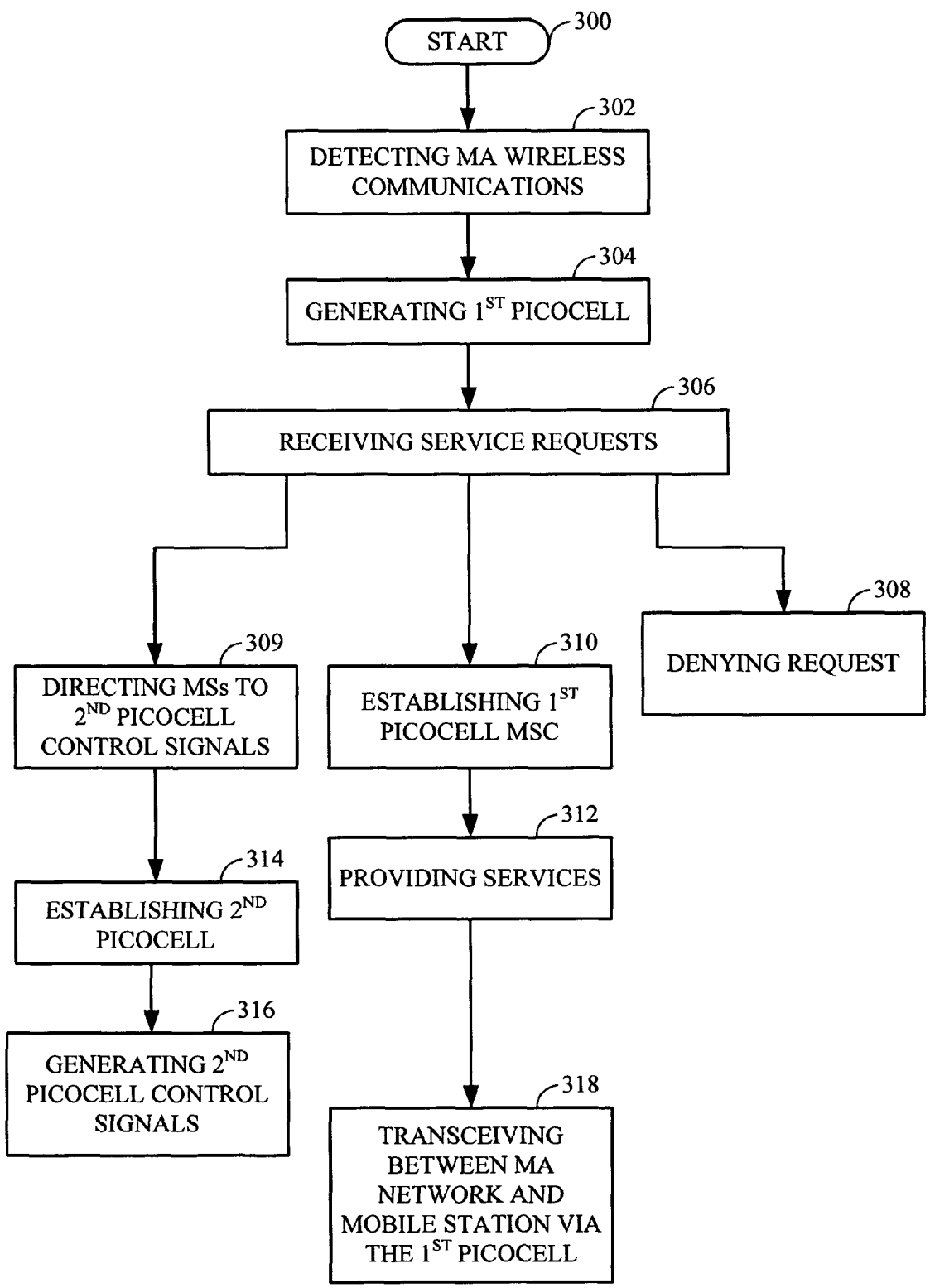
FIG. 5 is a flowchart illustrating a method for creating a picocell service alternate to a multiple access wireless network service.

FIG. 5 is a flowchart illustrating a method for creating a picocell service alternate to a multiple access wireless network service. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. Details of the method may be understood in the context of FIGS. 1 through 4. The method starts at Step 300.

Step 302 detects a multiple access (MA) wireless communications network. Step 304 generates a first picocell in response to detecting the MA wireless network. For example, detecting the MA wireless network in Step 302 may include: scanning a frequency spectrum; identifying signals in a spectrum band; identifying a signal modulation; identifying a system associated with the modulation; or, measuring the detected signal power level. In another example, identifying the system associated with the modulation in Step 302 may include identifying a cellular wireless telephone system; and, identifying a serving sector in the cellular telephone system.

In one aspect, detecting the MA wireless network in Step 302 includes: receiving control signals originating from a MA wireless network base station; and, identifying the MA wireless network in response to the base station control signals. Then, generating the first picocell in Step 304 includes generating first picocell control signals equivalent to the base station control signals.

In another aspect, detecting the MA wireless network in Step 302 includes detecting a MA wireless network providing a service. Then, generating first picocell control signals in Step 304 includes generating picocell control signals identifying a picocell service equivalent to the MA wireless network service.

In one aspect, receiving control signals originating from the MA wireless network base station (Step 302) includes receiving the base station control signals at a first power level in the picocell. Then, generating first picocell control signals (Step 304) includes generating picocell control signals having a second received power level in the picocell, greater than the first received power level. In a different aspect, Step 304 controls the transmit power levels of mobile stations in the picocell.

In one aspect, Step 306 receives requests from mobile stations for picocell service, in response to generating the first picocell. In another aspect, Step 308 denies all service requests made by mobile stations communicating in the picocell. Alternately, Step 306 generates control signals that prevent mobile stations, which are communicating in the first picocell (receiving the control signals), from making requests for network service.

In another aspect, Step 310 establishes a first picocell mobile services switching center (MSC). Then, Step 312 provides network services to mobile stations via the first picocell MCS, in response to receiving requests for picocell service in Step 306. In one aspect, detecting the MA network in Step 302 includes generating picocell management information, responsive to MA network information such as base station location, antenna height, antenna coverage, antenna type, morphology, control channel gains, traffic channel gains, frequency usage, or time slot usage. Then, providing network services to mobile stations via the first picocell MCS in Step 312 includes selecting channels and communication media that minimally interfere with the MA network, in response to the management information.

In one aspect, Step 318 transceives communications between a MA network and a mobile station, via the first picocell, using the management information. The communications are chosen to minimally interfere with the conventional operation of the MA network. For example, Step 318 may transceive communications between the MA network and the mobile station by scheduling high-burst communications between the MA network and the first picocell, responsive to the management information.

In a different aspect, Step 314 establishes a second picocell, and Step 316 generates second picocell control signals. Generating the first picocell in Step 304 includes generating first picocell control signals. Then, Step 309, in response to receiving requests for picocell service (Step 306), uses the first picocell control signals to direct the mobile stations to the second picocell control signals.

In one aspect, receiving control signals originating from the MA wireless network base station (Step 302) includes the base station control signals being received in a first medium. Then, generating first picocell control signals in Step 304 includes: generating first picocell control signals in the first medium; and, sending messages in the first picocell control signals directing mobile stations to control signals broadcast in an alternate medium. Step 316 generates second picocell control signals in the alternative medium. The alternate medium can be a medium such as an alternate frequency, an alternate time slot, an alternate channel, an alternate spreading code, and alternate frequency band, an alternate wireless telephone protocol, or an alternate technology, respective to the first medium.

A system and method are provided for creating a picocell alternative to MA wireless network service. Examples have been given for applications of the system. Examples have also been given of particular protocols and system structures to illustrate the invention. However, the invention is not limited to merely these examples. Other variations and embodiments of the invention will occur to those skilled in the art.

The invention claimed is:

1. A method for creating a communication service through a picocell alternate to a multiple access wireless network service, the method comprising:
   detecting a multiple access (MA) wireless telephone communications network;
   generating a first picocell in response to detecting the MA wireless network;
   receiving control signals originating from a MA wireless network base station;
   identifying the MA wireless network in response to the base station control signals; and
   generating first picocell control signals in the same frequency band as the base station control signals so as to deliberately interfere with and override the base station control signals in the first picocell such that a mobile station in the first picocell responds to the first picocell control signals instead of the base station control signals.

2. The method of claim 1 further comprising:
   receiving requests from mobile stations for communication service through the picocell, in response to generating the first picocell control signals.

3. The method of claim 2 further comprising:
   establishing a first picocell mobile services switching center (MSC); and
   providing network services to mobile stations via the first picocell MCS, in response to receiving requests for communication service through the picocell.

4. The method of claim 2 further comprising:
   establishing a second picocell;
   generating second picocell control signals; and
   the method further comprising;
   in response to receiving requests for communication service through the picocell, using the first picocell control signals to direct the mobile stations to the picocell control signals.

5. The method of claim 1, wherein detecting the MA wireless network includes detecting a MA wireless network providing a service; and
   wherein generating first picocell control signals includes generating picocell control signals identifying a communication service through the picocell equivalent to the MA wireless network service.

6. The method of claim 1, wherein receiving control signals originating from the MA wireless network base station includes receiving the base station control signals at a first power level in the picocell; and
   wherein generating first picocell control signals includes generating picocell control signals having a second received power level in the picocell, greater than the first received power level.

7. The method of claim 6 wherein generating the first picocell control signals includes controlling the transmit power levels of mobile stations in the picocell.

8. The method of claim 6 wherein receiving control signals originating from the MA wireless network base station includes the base station control signals being received in a first medium;
   wherein generating first picocell control signals includes:
   generating first picocell control signals in the first medium;
   sending messages in the first picocell control signals directing mobile stations to control signals broadcast in an alternate medium; and
   the method further comprising:
   establishing a second picocell network;
   generating second picocell control signals in the alternative medium.

9. The method of claim 8 wherein generating second picocell control signals in the alternate medium includes generating control signals in a medium selected from the group including an alternate frequency, an alternate time slot, an alternate channel, an alternate spreading code, and alternate frequency band, an alternate wireless telephone protocol, and an alternate technology, respective to the first medium.

10. The method of claim 1 wherein detecting the MA wireless network includes:
    scanning as frequency spectrum;
    identifying signals in a spectrum band;
    identifying a signal modulation;
    identifying a system associated with the modulation; and
    measuring the detected signal power level.

11. The method of claim 10 wherein identifying the system associated with the modulation includes identifying a cellular wireless telephone system; and
    wherein detecting the MA wireless network service further includes identifying a serving sector in the cellular telephone system.

12. The method of claim 2 further comprising:
    denying all service requests made by mobile stations communicating in the picocell.

13. The method of claim 1 further comprising:
    preventing mobile stations, which are communicating in the first picocell, from making requests for network service.

14. The method of claim 1 wherein detecting the MA network includes generating picocell management information, responsive to MA network information selected from the group including base station location, antenna height, antenna coverage, antenna type, morphology, control channel gains, traffic channel gains, frequency usage, and time slot usage; and,
    the method further comprising:
    transceiving communications between the MA network and a mobile station, via the first picocell, using, the management information.

15. The method of claim 3 wherein detecting the MA network includes generating picocell management information, responsive to MA network information selected from the group including base station location, antenna height, antenna coverage, antenna type, morphology, control channel gains, traffic channel gains, frequency usage, and time slot usage; and,
    wherein providing network services to mobile stations via the first picocell MCS includes selecting channels and communication media that minimally interfere with the MA network, in response to the management information.

16. The method of claim 1, further comprising transceiving communications between the MA wireless network and a mobile station via the first picocell.

17. The method of claim 16, wherein the MA wireless network comprises at least one of a terrestrial network or a satellite network.

18. The method of claim 16, further comprising scheduling communications between the first picocell and the MA wireless network to minimally interfere with the MA wireless network.

19. The method of claim 18, wherein the detecting further comprises identifying MA network information, the method further comprising predicting management information for managing resources of the first picocell based at least in part on the MA network information, wherein the scheduling is based on the predicting.

20. The method of claim 7, wherein controlling the transmit power levels further comprises reducing the transmit power levels.

21. The method of claim 1, wherein generating further comprises generating the first picocell inside an airplane.

22. The method of claim 20, further comprising transceiving communications between the MA wireless network and a mobile station via the first picocell, wherein the MA wireless network comprises at least one of a terrestrial network or a satellite network.

23. The method of claim 1, wherein generating the first picocell inside the airplane comprises generating while the airplane is in the air.

24. The method of claim 1, further comprising controlling a first transmit power level of the mobile station in communication with the first picocell such that the first transmit power level is lower than a second transmit power level for the mobile station to communicate with the MA wireless network.

25. The method of claim 1, wherein generating the first picocell is based on the received base station control signals corresponding to the strongest received MA wireless network control signals.

26. The method of claim 1, wherein generating the first picocell is based on the MA wireless network having a pilot signal lacking sufficient strength to support a minimum data rate.

27. The method of claim 1, wherein the detecting further comprises detecting a plurality of wireless communication networks each having a different technology and each having respective control signals, wherein the generating of the first picocell further comprises generating a plurality of picocells each corresponding to one of the plurality of wireless communication network and each having respective picocell control signals in the same frequency band as the respective wireless communication network control signals so as to deliberately interfere with and override the respective wireless communication network control signals such that a mobile station operating with a respective one of the different technologies in the respective one of the plurality of picocells responds to the respective picocell instead of the respective wireless communication network.

28. A method for creating a picocell service alternate to a multiple access wireless network service, the method comprising:
  detecting a multiple access (MA) wireless telephone communications network;
  generating a first picocell in response to detecting the MA wireless network; and
  preventing mobile stations, which are communicating in the first picocell, from making requests for network service;
  wherein the detecting further comprises detecting MA base station control signals; and
  spoofing the base station control signals with first picocell control signals in the same frequency band as the base station control signals so as to deliberately interfere with and override the base station control signals in the first picocell, and cause a mobile station in the first picocell to respond to the first picocell control signals instead of the base station control signals.

29. A method for creating a picocell service alternate to a multiple access wireless network service, the method comprising:
  detecting a multiple access (MA) wireless telephone communications network;
  generating a first picocell in response to detecting the MA wireless network;
  receiving requests from mobile stations for picocell service;
  denying all service requests made by mobile stations communicating in the picocell;
  wherein the detecting further comprises detecting MA wireless network base station control signals; and
  generating first picocell control signals in the same frequency band as the MA wireless network base station control signals so as to deliberately interfere with and override the MA wireless network base station control signals in the first picocell, and wherein the first picocell control signals spoof a mobile station in the first picocell to respond to the first picocell control signals instead of the MA wireless network base station control signals.

30. A method for creating a picocell service alternate to a multiple access wireless network service, the method comprising:
  detecting a multiple access (MA) wireless telephone communications network;
  generating a first picocell in response to detecting the MA wireless network;
  wherein the detecting further comprises receiving MA base station control signals at a first received power level; and
  generating picocell control signals based on the detected base station control signals, wherein the picocell control signals are in the same frequency band as the detected base station control signals so as to deliberately interfere with and override the detected base station control signals in the first picocell, wherein the picocell control signals have a second received power level in the first picocell greater than the first received power level in the first picocell, and wherein the picocell control signals comprise a spoof of the base station control signals that prevent a mobile station in the first picocell from communicating with the MA wireless network base station.

31. The method of claim 30, wherein generating a first picocell includes controlling the transmit power levels of mobile stations in the picocell to prevent the mobile stations from communicating with the MA wireless network.

32. An apparatus comprising:
  means for detecting a multiple access (MA) wireless telephone communications network;
  means for generating a first picocell in response to detecting the MA wireless network;
  means for receiving control signals originating from a MA wireless network base station;
  means for identifying the MA wireless network in response to the base station control signals; and
  means for generating first picocell control signals in the same frequency band as the base station control signals so as to deliberately interfere with and override the base station control signals in the first picocell such that a mobile station in the first picocell responds to the first picocell control signals instead of the base station control signals.

33. The apparatus of claim 32 further comprising:
  means for receiving requests from mobile stations for communication service through the picocell, in response to generating the first picocell control signals.

34. The apparatus of claim 33 further comprising:
  means for establishing a first picocell mobile services switching center (MSC); and means for providing network services to mobile stations via the first picocell MCS, in response to receiving requests for communication service through the picocell.

35. The apparatus of claim 33 further comprising:

means for establishing a second picocell;

means for generating second picocell control signals; and in response to receiving requests for communication service through the picocell, means for using the first picocell control signals to direct the mobile stations to the second picocell control signals.

36. An apparatus comprising:

a sniffer device to detect a multiple access (MA) wireless telephone communications network, to receive control signals originating from a MA wireless network base station, and to identify the MA wireless network in response to the base station control signals; and a spoofer device to generate first picocell control signals in the same frequency band as the base station control signals so as to deliberately interfere with and override the base station control signals in the first picocell such that a mobile station in the first picocell responds to the first picocell control signals instead of the base station control signals.

\* \* \* \* \*